United States Patent
Todd et al.

(10) Patent No.: US 7,109,324 B1
(45) Date of Patent: Sep. 19, 2006

(54) PROCESS FOR CHEMICALLY BONDING AN ODOR-ENCAPSULATING AGENT TO TEXTILES AND TEXTILES FORMED BY THE PROCESS

(75) Inventors: Donald Eugene Todd, Forest City, NC (US); David Alan Brown, Rutherfordton, NC (US)

(73) Assignee: Dan River, Inc., Danville, VA (US)

( * ) Notice: Subject to any disclaimer, the term of this patent is extended or adjusted under 35 U.S.C. 154(b) by 11 days.

(21) Appl. No.: 11/052,332

(22) Filed: Feb. 7, 2005

Related U.S. Application Data

(63) Continuation-in-part of application No. 10/427,428, filed on Apr. 30, 2003, now Pat. No. 6,861,520.

(51) Int. Cl.
  *C08B 37/08* (2006.01)
  *C08B 13/00* (2006.01)
  *C08B 37/16* (2006.01)

(52) U.S. Cl. ........................ 536/103; 536/123; 536/20; 536/124; 536/66; 536/116; 514/338; 424/439; 442/83; 8/120; 428/375; 526/303.1; 526/304; 526/328.5; 510/276

(58) Field of Classification Search ................ 536/103, 536/123, 20, 124, 66, 116; 514/338; 424/439; 442/83; 8/120; 428/375; 526/303.1, 304, 526/328.5; 252/8.61; 510/276
See application file for complete search history.

(56) References Cited

U.S. PATENT DOCUMENTS

2002/0007517 A1   1/2002   Moors et al.
2005/0081657 A1   4/2005   Nlederstadt et al.

*Primary Examiner*—Shaojia Anna Jiang
*Assistant Examiner*—Devesh Khare
(74) *Attorney, Agent, or Firm*—Kilpatrick Stockton LLP

(57) ABSTRACT

A process for chemically bonding an odor-encapsulating agent to textiles includes reacting a cyclodextrin with a cross-linking agent capable of forming ether bonds with the cyclodextrin and with the textile material, and curing the textile material treated with a mixture of the cyclodextrin and cross-linking agent. Preferably, the cross-linking agent is imidazolidone, which forms an ether bond with a hydroxyl group on the cyclodextrin and with a hydroxyl group. In textile materials containing cellulose, imidazolidone forms an ether bond with a hydroxyl group on the cellulose. An active agent can be complexed with the cyclodextrin for release. Textiles formed by such a process can comprise an article of clothing adapted to trap odors emanating from a wearer.

15 Claims, No Drawings

PROCESS FOR CHEMICALLY BONDING AN ODOR-ENCAPSULATING AGENT TO TEXTILES AND TEXTILES FORMED BY THE PROCESS

CROSS-REFERENCE TO RELATED APPLICATIONS

This application is a continuation-in-part application of, and claims priority to, U.S. patent application Ser. No. 10/427,428, filed Apr. 30, 2003, now U.S. Pat. No. 6,861,520 B1 which is incorporated herein in-full by reference.

FIELD OF THE INVENTION

The present invention relates to a process for attaching an odor-encapsulating agent to textiles and textiles formed by the process. In particular, the present invention relates to a process for chemically bonding cyclodextrin to textiles and the cyclodextrin-containing textiles thus formed.

BACKGROUND OF THE INVENTION

It is unavoidable that humans emanate odors. The odors may originate from numerous sources including natural bodily secretions such as perspiration and oils. In addition, a person's clothing may absorb odors and subsequently release them to the surrounding environment. Numerous cosmetic and health care products have been developed to mask unpleasant odors. Colognes, perfumes, scented soaps, deodorants and the like, which are employed for such purposes, mask an undesirable odor by replacing it with another odor that is considered more pleasing.

In certain situations, however, it is desirable to provide an odorless or scentless presence. For example, persons such as hunters, naturalists, wildlife photographers, and wildlife biologists must have the ability to approach wildlife animals in close proximity. Wildlife animals have a keenly developed sense of smell that can readily distinguish odors that are not indigenous to their natural habitat. Such odors may include those emanating from humans who attempt to gain close proximity to the animals. Perfumes, scented soaps, and colognes may mask odors but are themselves readily detected by the animals. Thus, there is a need for a means adapted to readily, efficiently, and effectively trap human odors such that a user presents a virtually odorless or scentless appearance, thereby enabling one to approach wildlife animals in close proximity.

Clothing articles have been designed to prevent detection of a wearer's odors by wildlife animals. Such clothing designs include deodorizing agents incorporated into one or more layers of fabric, for example, the designs disclosed in U.S. Pat. Nos. 5,383,236 and 5,539,930. Deodorizing agents that have been used in such fabrics include activated charcoal, chlorophyll, baking soda, activated alumina, soda lime, zeolite, calcium oxide, and potassium permanganate. Naturally occurring odors emanating from a wearer are trapped by such deodorizing agent(s).

Various kinds of deodorant particles are used as deodorizing agents. Activated carbon is a widely used agent which is capable of trapping a broad spectrum of odor-causing compounds. Activated carbon, often used in the form of activated charcoal, functions to deodorize by adsorbing odors. Odor adsorption by activated carbon occurs by increasing the surface porosity of the fabric and allowing odor-causing compounds to become physically attached to the fabric. Other physically adsorbing particles include zeolite and impregnated carbon. A disadvantage of using physically adsorbing particles to control odors is that the particles lose odor trapping effectiveness when they becomes moist, such as a hunter might experience in the field from perspiration and/or the environment. Moreover, odor-trapping particles that are physically attached to fabric can be loosened from the fabric during washing, further decreasing the availability of active agent in subsequent uses of the fabric. Furthermore, these agents can be harmful to fabrics and therefore are not preferred as an odor controlling agent for fabrics. For example, activated charcoal easily stains light colored fabrics, and zeolites are seen as a light colored stain on dark colored fabrics. Also, zeolites can cause a "harsh" feel if too much is deposited onto a fabric.

Other deodorant particles are classified into acidic or alkaline particles depending on the charge of the odoriferous material the particle can neutralize. Acidic deodorant particles, which can neutralize acidic odors, include, for example, potassium carbonate, potassium hydrogencarbonate, sodium carbonate, sodium hydrogencarbonate, ethanolamine, hexamethylenediamine, and piperazine. Alkaline deodorant particles, which can neutralize alkaline odors, include, for example, phosphoric acid, sulfuric acid, nitric acid, malic acid, citric acid, and ascorbic acid. A disadvantage of using both acidic and alkaline particles in the same fabric is that when particles have different charge states are adjacent, odoriferous materials may be leached from one deodorizing particle to another, thereby decreasing the overall deodorizing performance, as suggested by European Patent No. 0882485 B1. Therefore, it would be advantageous for a single deodorizing agent to neutralize odoriferous materials without regard to the ionic charge of the materials.

Other methods of odor control utilize agents, or "actives," that are targeted to react with odors having specific chemical functional groups. Examples of such actives are biguanide polymers, which complex with organic compounds containing organically bound nitrogen and/or sulfur atoms and fatty alcohol esters of methyl methacrylic acid which react with thiols, amines, and aldehydes. Such actives are limited in the scope of protection which they afford because they only react with limited types of odors.

Deodorant particles can be attached to fabric using various conventional means. For example, yarn and fabric can be treated with deodorizing agents by physically incorporating solid particles, such as activated carbon, into the yarn using a padding technique or an air dispersion technique. A disadvantage of physically attaching deodorant particles to a fabric is that the particles may not be uniformly distributed in the fabric.

Other methods involve using a binding agent to attach solid deodorizing particles to yarn. In one such technique, an aggregator resin is first attached to a fabric, and the particles are then aggregated onto the resin. In another means of attaching a deodorizing particle to a fabric, a fine grain mineral powder is attached to a fiber substrate with the adhesive effect of an aqueous dialdehyde starch. (See Japanese Patent Application No. 07067949 JP.) A disadvantage of using such binder materials to attach deodorant particles to a fabric is that the surfaces of the deodorant particles can be covered with the binder, which inhibits any deodorizing performance of the particles.

Other conventional methods for attaching deodorizing agents to yarns and fabrics employ chemically bonding the agents to the substrate. For example, Japanese Patent Application No. 01254274JP discloses chemically reacting various deodorizing agents, including polymers such as a vinylic polymer, a polyamino acid, an amino-modified silicone resin, and a hydroxylated ethyleneurea to a fiber product. In another example, U.S. Pat. No. 4,675,014 discloses a sanitary hygiene aid employing an absorbent material of cellulose fibers incorporating anionic salt-forming moieties through a process of esterification or etherification. Copper, used as a deodorizing agent, is chemically attached to the fibers through those anionic moieties, and is resistant to being washed out.

A relatively recent and widely used agent for odor control is cyclodextrin. Cyclodextrins are ring-shaped sugar molecules with a hydrophilic surface and an empty hydrophobic cavity. Cyclodextrins can form complexes with many guest molecules. Guest molecules are taken up, or encapsulated, by the chemical structure of cyclodextrins. As such, cyclodextrins have been added to materials for various purposes, including use as odor-encapsulating agents and to complex with and release actives such as antimicrobials and fragrances. For example, U.S. Pat. Nos. 5,783,552 and 5,660,845 disclose uncomplexed cyclodextrins incorporated into an article for trapping odors in the form of particles and powders, or releasably attached to a substrate.

A method of immobilizing uncomplexed and complexed cyclodextrins to cellulose fibers using a cross-linking means that covalently bonds the cyclodextrin to a substrate has been disclosed. Such a cross-linking means includes, for example, polymeric anionic reactive compounds having repeating units containing two or more anionic functional groups, such as carboxylic acids, anhydride groups, or the salts thereof. The cross-linking agent is disclosed as being capable of forming ester or hemiacetal bonds with hydroxyl groups on the polysaccharide of the substrate and with the cyclodextrin. This method is disclosed in PCT Application Publication No. WO 0148025, which is incorporated herein by reference in its entirety. A disadvantage of attaching cyclodextrin to cellulose in a fabric in this manner is that such chemical bonds are susceptible of being solubilized during washing of the fabric.

Other methods of attaching deodorizing agents have been found to increase resistance of attached particles to being washed away. As an example, Japanese Patent Application No. 11293559JP discloses that in an antimicrobial deodorant nylon fiber article, wash resistance is increased when silver-bearing titanium oxide microparticles are adsorbed onto the nylon fibers. Japanese Patent Application No. 09087955JP discloses securing deodorizing agents to a fabric by integrally forming the deodorizing agent with the fabric. In this approach, a thermoplastic polymer is blended with a deodorizing inorganic compound, the blend is melted, the molten mixture is extruded, continuous fibers are formed from the extrusion, and the fibers are collected on a substrate to form a web. Such approaches to improving wash resistance of an anti-odor agent on a fabric add additional steps, tend to be expensive, and are thus disadvantageous. Moreover, such methods have not been disclosed for improving cyclodextrin wash resistance.

Cyclodextrins can be treated with reactive moieties, or derivitized, to form derivatives that can in turn react with a fabric or other substrate. For example, cyclodextrin can be reacted with epicholohydrin and chlorinated or fluorinated triazinyl compounds, which can subsequently react with cellulose. These methods typically require pretreatment of the cyclodextrin before it can be combined with cellulose, and also suffer from safety, environmental, and high reactivity issues associated with the halogenated reactants. Accordingly, there is a need for improved methods of immobilizing cyclodextrin to cellulose in textiles that improve wash resistance and that are useful for making articles of clothing.

In addition, cyclodextrin particles and powders may shift away from the preferred location of an article, for example, in the underarm portion of a garment where the article is likely to be impinged by an odor, and move to areas where they are less effective for their intended purpose. This problem was addressed in U.S. Pat. No. 5,733,272 by the use of an "adhesive," such as polyethylene glycol to attach the cyclodextrin to particular areas of an article. However, immobilization of cyclodextrin using adhesives decreases the "hand," or feel, of the fabric as well as other characteristics desirable of fabric used in making clothing articles.

Imidazolidone has been used in textile finishing processes. For example, U.K. Patent No. 864,432 discloses reacting formaldehyde with heated urea and imidazolidone to permit a resin finish having a more linear molecular structure. The introduction of the linear structure of the urea/imidazolidone/formaldehyde finish more effectively maintains the flexibility and tensile strength of the textile than that produced by formaldehyde alone. In another conventional process, U.S. Pat. No. 3,652,583 discloses an ester exchange reaction of an imidazolidone compound and a water-soluble polyalkylene glycol to treat textile materials in order to increase hydrophilic, soil releasing, and resoiling resistance properties of the material.

Conventional techniques for preparing cellulose-containing materials have employed cross-linking with imidazolidone. For example, one method for obtaining resilient, bulking fibers useful for absorbent fabric structures in towels, diapers, medical dressings, and the like, involves cross-linking cellulose molecules in the fibers using a mixture of glyoxal and imidazolidone. U.S. Pat. No. 5,366,591 discloses such a process, in which the cross-linking agents are capable of combining with at least two hydroxyl groups of cellulose molecules. However, imidazolidone has not been advantageously utilized to provide strong ether bonds to cross-link odor-encapsulating cyclodextrin with cellulose in fabric.

Thus, there is a need to provide a process for chemically bonding an odor-encapsulating agent to textiles that provides a strong bond between the agent and the fabric to increase wash resistance and thereby provide more durable odor-encapsulating activity to the fabric. There is a need for such a process that bonds an odor-encapsulating agent to textiles in a more uniform manner, thereby enhancing the odor-encapsualting effectiveness of the treated fabric. There is a need for such a process that accomplishes such strong chemical bonding of an odor-encapsualting agent to a textile material in a single-step process without the need to first form derivatives of the agent. There is a need for such a process that chemically bonds a broad spectrum odor-encapsualting agent such as cyclodextrin to cellulose in a textile.

SUMMARY OF THE INVENTION

The present invention provides a process for attaching an odor-encapsulating agent to textiles and textiles formed by the process. In an embodiment of the present invention, a process for chemically bonding an odor-encapsulating agent to a textile material includes reacting an odor-encapsulating cyclodextrin with a cross-linking agent capable of forming ether bonds with the cyclodextrin and with the textile material. The textile material is treated with a mixture of the cyclodextrin and cross-linking agent to bond the cyclodextrin to the textile material. Cyclodextrin has the ability to entrap, or encapsulate, odor-causing compounds as inclusions in the cyclodextrin chemical structure.

In embodiments, when the cyclodextrin is reacted with the cross-linking agent, an ether bond is formed between the cross-linking agent and a hydroxyl group on the cyclodextrin. When the textile material is reacted with the cyclodextrin/cross-linking agent mixture, an ether bond is formed between the cross-linking agent and a hydroxyl group on the textile material. Cyclodextrin is thus bonded with ether linkages to cellulose molecules in a textile material. In preferred embodiments, the cross-linking agent is imidazolidone. Textile materials having cyclodextrin bonded through an imidazolidone-enabled ether linkage exhibit effective odor-absorbing activity. Olfactory detection of odors absorbed onto materials treated in this manner is significantly reduced.

Ether linkages bonding a hydroxyl group of a cyclodextrin to cellulose in a textile material, such as a fabric, are strong bonds that are water insoluble. The molecules of a cyclodextrin compound become water insoluble and remain bonded to a fabric during washing of the fabric. Because cyclodextrin is chemically cross-linked with the fabric by a strong ether bond, the attached cyclodextrin, and its odor-encapsulating capability, is durable and resists being removed from the fabric during washing. The strength of the ether bonds and the chemical configuration of cyclodextrin allow odor-causing compounds trapped in the cyclodextrin ring to be removed during washing without removing the cyclodextrin from the fabric.

Through stable ether bonds cross-linking cyclodextrin to a textile fabric, cyclodextrin is immobilized in a uniform manner throughout the fabric thickness. That is, cyclodextrin is immobilized on both sides of the fabric and to yarn fibers in the space between the two sides of the fabric. As such, distribution of cyclodextrin in a fabric is thorough and uniform, thereby enhancing the odor-encapsulating effectiveness of the treated fabric.

A wide range of cyclodextrins can be bonded to textile cellulose in the manner described herein. The cyclodextrin bonded to cellulose in a textile material can be, for example, an alpha-cyclodextrin, a beta-cyclodextrin, a gamma-cyclodextrin, a methyl-substituted cyclodextrin, an ethyl-substituted cyclodextrin, a hydroxyalkyl-substituted cyclodextrin, a branched cyclodextrin, an anionic cyclodextrin, a cationic cyclodextrin, a quaternary ammonium cyclodextrin, an amphoteric cyclodextrin, or mixtures thereof.

In addition to encapsualting odors, cyclodextrin bonded to cellulose in a textile material through an ether linkage can function to complex with and selectively release certain agents, or actives. For example, to control body odor, cyclodextrin can complex with an antimicrobial agent and/or a fragrance.

In an embodiment of the present invention, a process for chemically bonding an odor-encapsulating agent to a cellulose-containing textile material includes providing an odor-encapsulating cyclodextrin. The cyclodextrin is cross-linked with imidazolidone by forming an ether bond between the imidazolidone and a hydroxyl group on the cyclodextrin. The imidazolidone is cross-linked with the cellulose in the textile material by forming an ether bond between the imidazolidone and a hydroxyl group on the cellulose. The present invention includes embodiments of a textile material formed by such processes. Such a textile material can be utilized in the construction of an article of clothing adapted to encapsulate odors emanating from a wearer. Embodiments of such materials can encapsulate such odors as, for example, odors related to perspiration, incontinence, and reflux of gastric fluids by an infant. Alternatively, embodiments of the present invention can be utilized to trap environmental odors such that the odors are not detectable on a material when the material is removed from the odiferous environment. Such materials can be utilized in a variety of applications, including, for example, upholstery, drapery fabrics, and outdoor gear such as tents and sleeping bags. Embodiments of materials of the present invention can be utilized in HVAC filtration systems to minimize environmental odors in enclosed spaces. Embodiments of the present invention include materials that are woven, knitted, and/or nonwoven and that are formed by such processes to provide odor-encapsulating capabilities. Embodiments of the present invention include materials containing cellulose but that are not necessarily used in textile applications.

The present invention also includes embodiments of a process for finishing a textile material. One such textile finishing process includes dissolving in a water bath a textile finishing formulation comprising a cyclodextrin and an imidazolidone resin. A textile material containing cellulose is dipped into the water bath containing the cyclodextrin/imidazolidone mixture. The textile material is then padded and tentered, or heat dried under tension to control the width of the material. In preferred embodiments, the tentering process includes heating the textile material between about 320° F. and about 380° F. Following the tentering process, the textile material is "cured" in an oven at a temperature of about 320° F. for approximately two minutes to effect the desired chemical reactions. Under such curing conditions, the imidazolidone forms ether linkages with hydroxyl groups on the cyclodextrin and on the cellulose to bond the cyclodextrin to the textile material. Finally, the textile material is shrunk via compression to minimize later shrinkage.

In preferred embodiments, the cyclodextrin in the textile finishing formulation is 2-hydroxypropyl-beta-cyclodextrin. The textile finishing formulation utilized in such a process preferably includes a Lewis acid, such as magnesium chloride, to promote selective cross-linking of the cross-linking agent with hydroxyl groups of cyclodextrin and cellulose so as to minimize cyclodextrin-to-cyclodextrin cross-linking and cellulose-to-cellulose cross-linking. The textile finishing formulation can also include other ingredients, for example, a wetting agent, a pH adjuster, and a softening agent.

The present invention includes embodiments of a textile material formed by such a process for finishing a textile material. A textile material formed by such a process for finishing a textile material can be utilized in the construction of an article of clothing adapted to trap odors emanating from a wearer.

Features of a process for chemically bonding an odor-encapsulating agent to textiles and textiles formed by the process of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

A process for chemically bonding an odor-encapsualting agent to textiles and textiles formed by the process of the present invention provides numerous advantages over prior methods for attaching deodorizing agents to a fabric. For example, the present invention advantageously provides an odor-encapsualting cyclodextrin reacted with imidazolidone, which provides an ether linkage by which the cyclodextrin is chemically bonded to cellulose in a textile material, resulting in strong attachment of the cyclodextrin to the material.

Another advantage is that the present invention provides strong ether linkages bonding hydroxyl groups of a cyclodextrin to hydroxyl groups of cellulose in fabric that are water insoluble. Because cyclodextrin is chemically cross-linked with the fabric in a strong ether bond, the attached cyclodextrin, and its odor-encapsulating capability, is durable and resists being removed from the fabric during washing.

Another advantage is that the present invention provides, through chemical bonding, cyclodextrin immobilized in a uniform manner throughout a fabric thickness, that is, on both sides of the fabric and to yarn fibers in the space between the two sides of the fabric. As such, distribution of cyclodextrin in a fabric is thorough and uniform, thereby enhancing the odor-encapsulating effectiveness of the treated fabric.

Another advantage is that the present invention provides a cyclodextrin cross-linked to a cellulose-containing fabric by reacting the cyclodextrin with an imidazolidone resin in situ without having to first be derivitized. Accordingly, cyclodextrin can be chemically bonded in a stable and durable fashion to a fabric in a single finishing process.

Cyclodextrins chemically bonded to textile materials according to the present invention offer advantages over other odor-trapping agents. For example, whereas activated charcoal loses effectiveness when it becomes moist, the ability of cyclodextrin to sequester odor-causing compounds is not adversely affected by moisture, such as a hunter might experience in the field or by washing. Cyclodextrin adds essentially no weight or bulk to a fabric; thus, wearing comfort of a garment including cyclodextrin-containing fabric is maintained. Cyclodextrins generally do not cause harmful effects to fabrics, and fabric treated with cyclodextrin is indistinguishable to a wearer from untreated fabric. Although the cost of cyclodextrin is higher as compared to activated charcoal, the increased effectiveness and longevity of effective use of cyclodextrin minimize any cost differences.

As will be realized by those of skill in the art, many different embodiments of a process for chemically bonding an odor-encapsulating agent to textiles and textiles formed by the process according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

In embodiments of the present invention, a process for chemically bonding an odor-encapsulating cyclodextrin to a cellulose-containing textile material includes reacting the cyclodextrin with imidazolidone to form a cross-linking ether bond between the imidazolidone and a hydroxyl group on the cyclodextrin and a cross-linking ether bond between the imidazolidone and a hydroxyl group on the cellulose. Such a process provides a strong, water insoluble bond between the cyclodextrin and the textile material that is wash-resistant. As such, the stably bound cyclodextrin provides durable odor-trapping activity to such textile materials and to articles of clothing constructed from the materials.

Odor

The term "body odor," as used herein, means odors which are generated as a result of the natural functioning of a human body. Such odors include odors produced by microorganisms of the skin through decomposition of skin secretions, urine, other body odors, and mixtures thereof. Such odors are mainly organic molecules, which have different structures and functional groups, such as amines, acids, alcohols, aldehydes, ketones, phenolics, and polycyclics including aromatics and polyaromatics. These molecules may also be made up of sulfurs containing functional groups, such as thiol, mercaptan, sulfide and/or disulfide groups.

Cyclodextrin

Cyclodextrins are cyclic oligomers of glucose which typically contain 6, 7, or 8 glucose monomers joined by alpha-1,4 linkages. These oligomers are commonly called alpha-cyclodextrin, beta-cyclodextrin, and gamma-cyclodextrin, respectively. Higher oligomers containing up to 12 glucose monomers are known, but their preparation is more difficult. Cyclodextrins can be produced enzymatically from starch, are generally safe for humans, and are non-polluting. Cyclodextrins are commercially available from a number of sources.

In general, cyclodextrins include glucose units arranged in a ring shape. The specific coupling and conformation of the glucose units give the cyclodextrins a rigid, conical molecular structure with a hollow interior of a specific volume. The approximate cavity size is 5.2 angstroms for alpha-cyclodextrins, 6.6 angstroms for beta-cyclodextrins, and 8.4 angstroms for gamma-cyclodextrins. Cyclodextrins offer a toroidal geometry with a hydrophilic exterior, which allows the cyclodextrin to dissolve in water. The "lining" of the internal cavity is formed by hydrogen atoms and glycosidic bridging oxygen atoms. The interior surface, therefore, is relatively hydrophobic. A cyclodextrin ring has two highly reactive hydroxyl groups with which a cross-linking agent can provide a strong ether linkage with a hydroxyl group in the textile material.

Cyclodextrins have useful chemical properties such as the inclusion of chemicals in the toroidal cavity. This cavity can be filled with all or a portion of an organic molecule with suitable size to form an "inclusion complex." Odor-causing compounds can be trapped inside the chemical structure of the hydrophobic cyclodextrin ring by steric hindrance. Steric hindrance is the phenomenon of physical blockage of a particular site within a molecule by the presence of local atoms or groups of atoms. Accordingly, cyclodextrins can form complexes with many odoriferous molecules in the cavity. The term "encapsulating," as used herein, means the inclusion of chemicals in the toroidal structure. Therefore, cyclodextrins, and especially mixtures of cyclodextrins with different size cavities, can be used to encapsulate and control odors caused by a broad spectrum of organic odoriferous materials. In addition, cyclodextrins can be used to releaseably complex with chemicals, such as perfumes, drugs, flavors, insecticides, odor-mitigating chemicals, skin wellness compounds, and the like.

Individual cyclodextrins can also be linked together, for example, using multifunctional agents to form oligomers and polymers. Cyclodextrin rings can also be bound together to form polymers by processes such as linking the cyclodextrin rings together with suitable multifunctional agents. Cyclodextrins having small particle sizes aid in providing higher cyclodextrin surface availability for odor absorption and therefore are preferred. Small particle cyclodextrins typically have a particle size of less than about 12 microns.

Cyclodextrins useful in embodiments of the present invention can be unsubstituted, such as alpha-, beta-, and gamma-cyclodextrins. The methods of the present invention do not rely on derivitization of cyclodextrin. Derivitized, or substituted, cyclodextrins may be used, but the cross-linking means is adapted to react with a hydroxyl group on the cyclodextrin and does not require added functional groups on the cyclodextrin to bond the cyclodextrin to cellulose molecules. Examples of cyclodextrin derivatives that may be of use herein are a methyl-substituted cyclodextrin, an ethyl-substituted cyclodextrin, a hydroxyalkyl-substituted cyclodextrin, a quaternary ammonium cyclodextrin, and an amphoteric cyclodextrin. A branched cyclodextrin, an anionic cyclodextrin, a cationic cyclodextrin, and mixtures of cyclodextrins can be effectively used.

In embodiments of the present invention, it may be desirable to use a mixture of cyclodextrins. Preferably at least a major portion of the cyclodextrins are alpha-, beta-, and gamma-cyclodextrins. A mixture of cyclodextrins is preferable for trapping odors, since mixtures encapsulate body odors more broadly by complexing with a wider range of odoriferous molecules having a wider range of molecular sizes.

The term "uncomplexed cyclodextrin" as used herein means that the cavities within the cyclodextrin are unfilled before the cyclodextrin is used. The term "complexed cyclodextrin" as used herein means that the cavities within the cyclodextrin are at least partially filled before the cyclodextrin is used.

The complexation between cyclodextrin and odoriferous molecules occurs rapidly when wetted with water or body fluids. This is convenient in finishing textile materials because the cyclodextrins, while dry, will not fill their cavities with other environmental odors that would otherwise render them less efficient for trapping body odors. When cyclodextrins are solubilized by moisture and/or fluids generated by the body, the isolated cavities become available to form inclusion complexes with body odor molecules. Similarly, the solubilization of complexed cyclodextrin is important for the release of the complexed molecules.

Incorporating adjunct odor-controlling materials can enhance the capacity of the cyclodextrin to control odors as well as broaden the range of odor types and molecule sizes which can be controlled. Such materials include, for example, metallic salts, water-soluble cationic and anionic polymers, zeolites, water-soluble bicarbonate salts, and mixtures thereof. In addition, an antimicrobial active that kills organisms that cause odor and infections can be complexed with cyclodextrin for release. Adjunct odor-controlling materials can be complexed with cyclodextrin or attached to a textile material by other means.

Textile Material/Cellulose Substrate

The term "textile" and/or "textile material," as used herein, means any material that can be used in constructing fabrics, including textile fibers and yarns. Constructed textile fabrics include woven, knitted, and nonwoven structures, as well as lace and crocheted goods.

The term "cellulose" or "cellulosic" as used herein refers to any material having cellulose or a cellulose derivative as a major constituent. The term includes cotton, typical wood pulps, cellulose acetate, cellulose triacetate, rayon, and the like. The term also includes synthetic cellulose fiber types including all varieties of rayon and other fibers derived from viscose or chemically modified cellulose. The term further includes chemically treated natural cellulosic fibers such as mercerized pulps, chemically stiffened or cross-linked fibers, sulfonated fibers, and the like. In particular, the term includes cellulose spun, or extruded, from a solution and known as lycocell.

Cross-Linking Agent

The immobilizing, or cross-linking, means functions to attach the cyclodextrin to the textile material substrate by bonding to both the cyclodextrin and the substrate. A preferred cross-linking agent is imidazolidone. Imidazolidone is a water-soluble, organic compound capable of providing ether bonds between hydroxyl groups of a cyclodextrin and hydroxyl groups of cellulose. Ether bonds are particularly useful to bond cyclodextrins to a cellulosic substrate because ether bonds are durable in the presence of water and ordinary body fluids, and can be broken at only at a very low pH.

Complexed Compounds

Cyclodextrins can be used to complex to a compound so that the complexed compound is releasable, preferably over a period of time. "Complexed agents" or "complexed compounds" are compounds that form inclusion complexes with a cyclodextrin, and preferably are compounds which are attracted to the hydrophobic interior of cyclodextrin. Generally, the complexed agent is selected for a particular function such as providing a desirable odor or other benefit in response to a change in environmental conditions, such as becoming wetted. Many different compounds can be complexed by cyclodextrin and used in finishing textile materials as described herein. Examples of complexed compounds include perfumes, flavors, pharmaceuticals such as antibacterial agents, and other chemicals.

The complexed chemical can be a perfume, so that the composition provides a "scent signal" in the form of a pleasant odor which signals the removal of a malodor from, for example, an article of clothing, or its environment. In embodiments, the cyclodextrin includes both uncomplexed cyclodextrin and perfume-complexed cyclodextrin. In other embodiments, the cyclodextin serves to release perfume only, does not serve to entrap odors, and will thus include only perfume-complexed cyclodextrin. Other embodiments include scents that, for example, mimic naturally-occurring attractants, such as musk.

Many types of perfumes can be used in the cyclodextrin compositions of the present invention. There are however, perfume characteristics which are preferred for different applications. Moreover, selection of the perfume will depend upon what type of release is desired, whether it be immediately upon contact with a fluid or over a period of time.

Cyclodextrins can be complexed with many other types of chemicals, such as pharmaceuticals. A wide range of drugs have been suggested for complexation with cyclodextrin, including those described in U.S. Pat. No. 4,727,064. A cyclodextrin complex of a pharmaceutical can be immobilized onto the cellulose fibers of a textile article to provide release of that pharmaceutical when the article is used. For example, an antibacterial agent can be released as a diaper is used to discourage the growth of bacteria on the diaper, either during or after use. As another example, a pharmaceutical agent/cyclodextrin complex can be chemically attached to cellulose based pad for use in transdermal delivery of that agent. As another example, an insecticide/cyclodextrin complex can be chemically attached onto a cellulose containing material to provide protection against insects.

Method of Attaching Cyclodextrins to Cellulosic Fabric

In general, the cyclodextrin, the cross-linking agent, and the cellulose-containing textile material are combined and the mixture is then cured, causing the cross-linking agent to bond to the cyclodextrin and to the cellulose molecules. The cyclodextrin and cross-linking agent can be combined first and then applied to the cellulose fibers, or the cyclodextrin, cross-linking agent, and cellulose can be combined in the same step. In particular, an aqueous solution containing the cyclodextrin, the cross-linking agent, and a catalyst can be applied to the cellulose fibers that are then exposed to conditions to cure the cross-linking agent. Accordingly, the attachment of the cyclodextrin to the cellulose-containing textile material is accomplished in a single, continuous processing step. This method allows cyclodextrin to be cross-linked to cellulose in fewer steps than other methods, which are based on first derivitizing cyclodextrin and then cross-linking the derivitized cyclodextrin with cellulose.

Method for Finishing Textiles

A preferred formulation for a cyclodextrin/imidazolidone mixture of the present invention for finishing textiles is given in Table 1.

TABLE 1

Cyclodextrin Finishing Formulation

| Ingredient | Amount (grams/liter) |
| --- | --- |
| Basol WS | 6 |
| Citric Acid | 1 |
| Cavasol W7HP TL9 (40% sol.) | 125 |
| Persoftal PEN | 30 |
| Permafresh 113B | 100 |
| Catalyst KR | 25 |

Basol WS is a nonionic wetting agent. Citric acid is used for controlling pH at approximately 5.0. Cavasol W7HP TL9 is a 2-hydroxypropyl-beta-cyclodextrin product available from Wacker Biochem Corp. A 40% solution of the cyclodextrin is used. Persoftal PEN is a polyethylene emulsion for softening. Permafresh 113B contains an imidazolidone resin. Catalyst KR comprises magnesium chloride.

In a preferred embodiment of a method for finishing textiles, the cyclodextrin finishing formulation in Table 1 is dissolved in a water bath. A fabric comprising cellulose is dipped into the water bath containing the cyclodextrin finishing formulation, where the cyclodextrin, cellulose, and imidazolidone are brought into intimate contact with the fabric. The fabric is then passed through a padding, or "squeeze rod," mechanism that uniformly expresses the finishing formulation from the fabric, leaving approximately 70% by weight of the formulation on the fabric. The fabric next undergoes a tentering process, in which the fabric is heat dried under tension to control width. Temperatures in the tenter zones are preferably in the range of 320–380° F. The fabric is then cured by heating in an oven at a temperature of about 320° F. for approximately two minutes. During this curing process, the imidazolidone forms ether linkages with hydroxyl groups on the cyclodextrin and on the cellulose molecules to chemically bond the cyclodextrin to the fabric. The fabric is then shrunk via compression to control shrinkage. Finally, the fabric is inspected and rolled for storage and/or shipping. In this manner, cyclodextrin is cross-linked in a stable and durable fashion to a cellulose-containing fabric in a single, continuous finishing process.

The cyclodextrin formulation is typically reacted in an excess amount of imidazolidone resin, which allows some of the ether linkages to be between one cyclodextrin ring and another cyclodextrin ring and/or between one cellulose molecule and another cellulose molecule. The magnesium chloride, (Catalyst KR) acts as a Lewis acid to promote selective cross-linking between cyclodextrin hydroxyl groups and cellulose hydroxyl groups and decreases the amount of cyclodextrin-to-cyclodextrin bonding and cellulose-to-cellulose bonding. Thus, the magnesium chloride increases the efficiency of cyclodextrin-to-cellulose bonding.

The following three examples of finishing a textile exemplify embodiments of a process for chemically bonding an odor-encapsulating agent to textiles and textiles formed by the process according to the present invention. In particular, these exemplary processes utilize a beta-cyclodextrin.

EXAMPLE 1

Textile Finish Formulation I

| Ingredient | Weight Percent |
| --- | --- |
| Basol WS | 0.6 |
| Acetic Acid | 0.2 |
| Permafresh 113B | 10.0 |
| Aldor 1465 | 0.2 |
| Cavasol W7HP (40%) | 12.5 |
| Mykon HD | 3.0 |
| Sil Fin WHP | 2.0 |
| Catalyst KR | 2.5 |
| Water | Remainder |

Basol WS is a nonionic wetting and dispersing agent. Acetic acid is used for controlling pH at approximately 5.0. Permafresh 113B contains an imidazolidone resin. Aldor 1465 is an aromatic odorant (perfuime). Cavasol W7HP is a 2-hydroxypropyl-beta-cyclodextrin product available from Wacker Biochem Corp. A 40% solution of the cyclodextrin is used. Mykon HD is a high-density polyethylene emulsion used for softening and sewing lubricity. Sil Fin WHP is an amino-functional silicone emulsion used for softening. Catalyst KR comprises magnesium chloride, which acts as a Lewis acid. These ingredients are mixed into an aqueous solution, the remainder of the formulation by weight percent being water.

Three samples of shirting weight fabric were finished with textile finish formulation I. In this process, the ingredients of textile finish formulation I were dissolved in a water bath, and the fabric was dipped into the finish bath. The fabric was then passed through a padding mechanism and run at a rate of 60 yards per minute with no vacuum. Next, the fabric sample was tentered, or dried under a width-control tension. Temperatures in the tenter zones ranged from 360–380° F. The fabric was then cured by heating in an oven at a temperature of 320° F. for approximately two minutes. The fabric was then compressively shrunk to control shrinkage. Following the finishing process, each sample was washed at a temperature of 120° F. to simulate consumer washing of garments containing such fabrics. Each sample was evaluated for physical properties, including construction (picks and ends), width, and weight. Dimensional stability was evaluated for appearance, tensile strength, tear strength using an Elmendorf tear tester, random tumble pilling, yarn slippage, and flex abrasion. Each sample was also tested for colorfastness.

The first sample was a 65% polyester/35% cotton blue stripe shirting fabric. The second sample was a 65% polyester/35% cotton red stripe shirting fabric. The third sample was a 60% cotton/40% polyester oxford shirting fabric. After finishing with textile finish formulation I using the Example 1 process parameters, cyclodextrin was chemically bound to cellulose molecules in each shirting fabric sample with a strong ether linkage provided by reaction with imidazolidone. Each sample was found to have characteristics within normal ranges for physical properties, dimensional stability, and colorfastness.

EXAMPLE 2

| Textile Finish Formulation III | |
|---|---|
| Ingredient | Weight Percent |
| Basol WS | 0.6 |
| Acetic Acid | 0.1 |
| Permafresh 113B | 10.0 |
| Cavasol W7HP (40%) | 14.0 |
| Catalyst KR | 2.5 |
| Water | remainder |

Basol WS is a nonionic wetting and dispersing agent. Citric acid is used for controlling pH at approximately 5.0. Permafresh 113B contains an imidazolidone resin. Cavasol W7HP is a 2-hydroxypropyl-beta-cyclodextrin product available from Wacker Biochem Corp. A 40% solution of the cyclodextrin is used. Persoftal PEN is a polyethylene emulsion for softening. Catalyst KR comprises magnesium chloride, which acts as a Lewis acid. These ingredients are mixed into an aqueous solution, the remainder of the formulation by weight percent being water.

Two lot samples of a hunter's camouflage print cotton twill fabric were finished with textile finish formulation II. In this process, the ingredients of textile finish formulation II were dissolved in a water bath, and the fabric was dipped into the finish bath. The fabric was then passed through a padding mechanism and run at a rate of 60 yards per minute with no vacuum. Next, the fabric sample was tentered, or dried under a width-control tension. Temperatures in the tenter zones ranged from 360–380° F. The fabric was then cured by heating in an oven at a temperature of 320° F. for approximately two minutes. The fabric was then compressively shrunk to control shrinkage. Following the finishing process, each sample was washed at a temperature of 120° F. to simulate consumer washing of garments containing such fabrics. Each sample was evaluated for physical properties, including construction (picks and ends), width, and weight. Dimensional stability was evaluated for appearance, tensile strength, tear strength using an Elmendorf tear tester, random tumble pilling, yarn slippage, and flex abrasion. Each lot sample was also tested for colorfastness.

After finishing with textile finish formulation II using the Example 2 process parameters, cyclodextrin was chemically bound to cellulose molecules in each of the cotton twill fabric samples with a strong ether linkage provided by reaction with imidazolidone. Each sample was found to have characteristics within normal ranges for physical properties, dimensional stability, and colorfastness.

EXAMPLE 3

| Textile Finish Formulation III | |
|---|---|
| Ingredient | Weight Percent |
| Basol WS | 0.6 |
| Acetic Acid | 0.1 |
| Permafresh 113B | 10.0 |
| Cavasol W7HP (40%) | 14.0 |
| Catalyst KR | 2.5 |
| Water | remainder |

Basol WS is a nonionic wetting and dispersing agent. Acetic acid is used for controlling pH at approximately 5.0. Permafresh 113B contains an imidazolidone resin. Cavasol W7HP is a 2-hydroxypropyl-beta-cyclodextrin product available from Wacker Biochem Corp. A 40% solution of the cyclodextrin is used. Catalyst KR comprises magnesium chloride, which acts as a Lewis acid. These ingredients are mixed into an aqueous solution, the remainder of the formulation by weight percent being water.

A sample of a 60% Tencel® lyocell/40% cotton, pigment-dyed fabric was finished with textile finish formulation III. Tencel® is a trademark of Courtaulds (Accordis) for a high performance, solvent spun cellulosic fiber used for higher priced apparel, home textiles, uniforms, and engineered fibers. In this process, the ingredients of textile finish formulation III were dissolved in a water bath, and the fabric was dipped into the finish bath. The fabric was then passed through a padding mechanism and run at a rate of 60 yards per minute with no vacuum. Next, the fabric sample was tentered, or dried under a width-control tension. Temperatures in the tenter zones ranged from 320–370° F. The fabric was then cured by heating in an oven at a temperature of 340° F. for approximately two minutes. The fabric was then compressively shrunk to control shrinkage. Following the finishing process, each sample was washed at a temperature of 120° F. to simulate consumer washing of garments containing such fabrics. Dimensional stability was evaluated for tensile strength, tear strength using an Elmendorf tear tester, yarn slippage, and flex abrasion.

After finishing with textile finish formulation III using the Example 3 process parameters, cyclodextrin was chemically bound to cellulose molecules in the Tencel®/cotton blend fabric with a strong ether linkage provided by reaction with imidazolidone. The sample was found to have characteristics within normal ranges for physical properties and dimensional stability.

Methods of Using Textiles Formed by the Process

Textile articles including cyclodextrin chemically bonded to cellulose fibers in embodiments of the present invention can be used in a variety of applications. Such textiles can be used in any situation or environment in which it is desired to control odors and/or to release agents such as perfumes. For example, such textiles having chemically bound cyclodextrins can be advantageously used in articles of clothing, including shirts, underwear, socks, shoes, and outer wear. Articles of clothing that may be constructed in accordance with the present invention may be adapted to be worn by and substantially surround at least a portion of a person. For example, an article of clothing including chemically bound cyclodextrin can be used as a covering for the head, a covering for the upper body, a covering for the lower body, a covering for the hand, a covering for the foot, and as a full body suit. In this manner, cyclodextrin-containing cellulose articles provide a means to encapsulate a wearer's body odors and prevent detection by wildlife.

Textile materials having chemically bound cyclodextrins can also be beneficially utilized in home furnishings, including mattress pads, towels, carpets, drapes, and upholstery. Embodiments of textile materials of the present invention can be effectively used, for example, to encapsulate odors in medical textiles, such as in bandages and hospital gowns and sheets. Textiles treated with cyclodextrin in accordance with the present invention can be used in personal care products such as feminine hygiene products, incontinence products, diapers, and other fluid-absorbent pads. Antimicrobial agents can be combined in cyclodextrin-containing garments to enhance control of body odor and/or for other purposes.

Fabric treated with cyclodextrin in embodiments of the present invention can be used to make all or a portion of a textile article. Alternatively, cyclodextrin can be bonded to a textile article after it has been formed. The cyclodextrin can be incorporated homogeneously throughout the areas of cellulose in a textile article or, if desired, can be incorporated at preferred locations in the pre-formed article.

Textile articles that include cyclodextrin chemically bound to cellulose as in the present invention can also be used for controlled delivery of drugs and other biological molecules from the cyclodextrin to a localized area. For example, cyclodextrin-containing cellulose can be incorporated into a transdermal patch. As one example, a cyclodextrin complex of a pharmaceutical can be attached onto the cellulose fibers of an article to provide release of that pharmaceutical when the article is used. For example, an antibacterial agent can be released as a diaper is used to discourage the growth of bacteria on the diaper, either during or after use. As another example, an insecticide/cyclodextrin complex can be attached onto a cellulose-containing material to provide protection against insects.

Although the present invention has been described with reference to particular embodiments, it should be recognized that these embodiments are merely illustrative of the principles of the present invention. Those of ordinary skill in the art will appreciate that a process for chemically bonding an odor-encapsulating agent to textiles and textiles formed by the process of the present invention may be constructed and implemented in other ways and embodiments. Accordingly, the description herein should not be read as limiting the present invention, as other embodiments also fall within the scope of the present invention.

What is claimed is:

1. A textile material formed by the process comprising:
providing an odor-encapsulating cyclodextrin and an imidazolidone cross-linking agent in a water bath;
dipping the textile material into the water bath;
removing the textile material from the water bath; and
heating the textile material in an oven at a temperature of about 320° F. for approximately two minutes,
wherein the cyclodextrin is cross-linked with imidazolidone by forming an ether bond between the imidazolidone and a hydroxyl group on the cyclodextrin; and
wherein the imidazolidone is cross-linked with the cellulose in the textile material by forming an ether bond between the imidazolidone and a hydroxyl group on the cellulose.

2. The textile material of claim 1, wherein the textile material comprises an article of clothing adapted to trap odors emanating from a wearer.

3. A textile material formed by the process comprising:
dissolving in a water bath a textile finishing formulation comprising a cyclodextrin and an imidazolidone;
dipping into the water bath a textile material comprising cellulose;
padding the textile material;
tentering the textile material by heat drying the textile material under tension;
curing the textile material in an oven at a temperature of about 320° F. for approximately two minutes wherein the imidazolidone forms ether linkages with hydroxyl groups on the cyclodextrin and on the cellulose to bond the cyclodextrin to the textile material; and
shrinking the textile material via compression.

4. The textile material of claim 3, wherein the textile material comprises an article of clothing adapted to trap odors emanating from a wearer.

5. A textile material formed by the process comprising:
providing a textile finishing formulation comprising a cyclodextrin, an imidazolidone resin, magnesium chloride, a wetting agent, a pH adjuster, and a softening agent;
dissolving the textile finishing formulation in a water bath;
dipping into the water bath a textile material containing cellulose;
padding the textile material;
tentering the textile material by heat drying under tension between about 320° F. and about 380° F.;
curing the textile material in an oven at a temperature of about 320° F. for approximately two minutes wherein the imidazolidone forms ether linkages with hydroxyl groups on the cyclodextrin and on the cellulose to bond the cyclodextrin to the textile material; and
shrinking the textile material via compression.

6. The textile material of claim 5, wherein the textile material comprises an article of clothing adapted to trap odors emanating from a wearer.

7. A fabric, comprising:
cellulose;
an imidazolidone cross-linked with an ether bond to a hydroxyl group on the cellulose; and
a cyclodextrin cross-linked to the imidazolidone with an ether bond between the imidazolidone and a hydroxyl group on the cyclodextrin.

8. The fabric of claim 7, wherein the cyclodextrin comprises an alpha-cyclodextrin, a beta-cyclodextrin, a gamma-cyclodextrin, a methyl-substituted cyclodextrin, an ethyl-substituted cyclodextrin, a hydroxyalkyl-substituted cyclodextrin, a branched cyclodextrin, an anionic cyclodextrin, a cationic cyclodextrin, a quaternary ammonium cyclodextrin, an amphoteric cyclodextrin, or a mixture thereof.

9. The fabric of claim 7, further comprising a compound complexed with the cyclodextrin for release.

10. The fabric of claim 9, wherein the compound complexed with the cyclodextrin comprises an antimicrobial agent, a perfume, an odor-mitigating chemical, or an insecticide.

11. A fabric comprising:
an imidazolidone cross-linked with an ether bond to the fabric; and
an odor-encapsulating cyclodextrin cross-linked with an ether bond to the imidazolidone.

12. The fabric of claim 11, wherein the imidazolidone is cross-linked with an ether bond to a hydroxyl group on the fabric and wherein the imidazolidone is cross-linked with an ether bond to a hydroxyl group on the cyclodextrin.

13. The fabric of claim 11, wherein the cyclodextrin comprises an alpha-cyclodextrin, a beta-cyclodextrin, a gamma-cyclodextrin, a methyl-substituted cyclodextrin, an ethyl-substituted cyclodextrin, a hydroxyalkyl-substituted cyclodextrin, a branched cyclodextrin, an anionic cyclodextrin, a cationic cyclodextrin, a quaternary ammonium cyclodextrin, an amphoteric cyclodextrin, or a mixture thereof.

14. The fabric of claim 11, further comprising a compound complexed with the cyclodextrin for release.

15. The fabric of claim 14, wherein the compound complexed with the cyclodextrin comprises an antimicrobial agent, a perfume, an odor-mitigating chemical, or an insecticide.

* * * * *

UNITED STATES PATENT AND TRADEMARK OFFICE
CERTIFICATE OF CORRECTION

PATENT NO. : 7,109,324 B1  Page 1 of 1
APPLICATION NO. : 11/052332
DATED : September 19, 2006
INVENTOR(S) : Donald Eugene Todd and David Alan Brown It is certified that error appears in the above-identified patent and that said Letters Patent is hereby corrected as shown below:

In col. 13, lines 18-27, following "Example 2," replace the table entitled "Textile Finish Formulation III" with the following table:

Textile Finish Formulation II

| Ingredient | Weight Percent |
|---|---|
| Basol WS | 0.6 |
| Citric Acid | 0.1 |
| Permafresh 113B | 10.0 |
| Cavasol W7HP (40%) | 12.5 |
| Persoftal PEN | 3.0 |
| Catalyst KR | 2.5 |
| Water | remainder. |

Signed and Sealed this

Fifth Day of December, 2006

JON W. DUDAS
*Director of the United States Patent and Trademark Office*